United States Patent
Bayer et al.

[19]

[11] Patent Number: 6,095,558

[45] Date of Patent: Aug. 1, 2000

[54] GAS GENERATOR MADE OF METAL SHEETS FOR PROTECTIVE DEVICES OF MOTOR VEHICLES PASSENGERS

[75] Inventors: Karl Bayer, Berg; Uwe Brede, Furth, both of Germany

[73] Assignee: Dynamit Nobel GmbH Explosivstoff-und Systemtechnik

[21] Appl. No.: 08/894,404

[22] PCT Filed: Feb. 13, 1996

[86] PCT No.: PCT/EP96/00604

§ 371 Date: Nov. 12, 1997

§ 102(e) Date: Nov. 12, 1997

[87] PCT Pub. No.: WO96/26088

PCT Pub. Date: Aug. 29, 1996

[30] Foreign Application Priority Data

Feb. 18, 1995 [DE] Germany ............................ 195 05 580

[51] Int. Cl.[7] .................................................. B60R 21/26
[52] U.S. Cl. ........................................... 280/741; 280/736
[58] Field of Search ..................................... 280/741, 736

[56] References Cited

U.S. PATENT DOCUMENTS

| | | | |
|---|---|---|---|
| 5,398,967 | 3/1995 | Carothers et al. | 280/741 |
| 5,501,487 | 3/1996 | Trevillyan et al. | 280/736 |
| 5,531,474 | 7/1996 | Osborne et al. | 280/741 |

FOREIGN PATENT DOCUMENTS 4121039 1/1993 Germany .

*Primary Examiner*—Eric Culbreth
*Attorney, Agent, or Firm*—Antonelli, Terry, Stout & Kraus, LLP

[57] ABSTRACT

A gas generator of sheet-metal constructional type for a motor vehicle passenger protection device, the generator having a concentric style of construction with a combustion chamber (2) with a gas-generating charge (3) being disposed around an ignition chamber having an igniter and an ignition charge (1) and the combustion chamber (2) being surrounded by an expansion chamber (4). To achieve lower manufacturing costs, a smaller overall size combined with less weight and good recycling properties, the sheet metal parts forming the combustion chamber (2) and the expansion chamber (4) are connected to one another exclusively by metal-forming techniques.

11 Claims, 4 Drawing Sheets

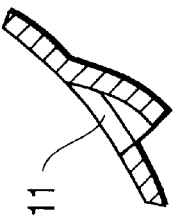
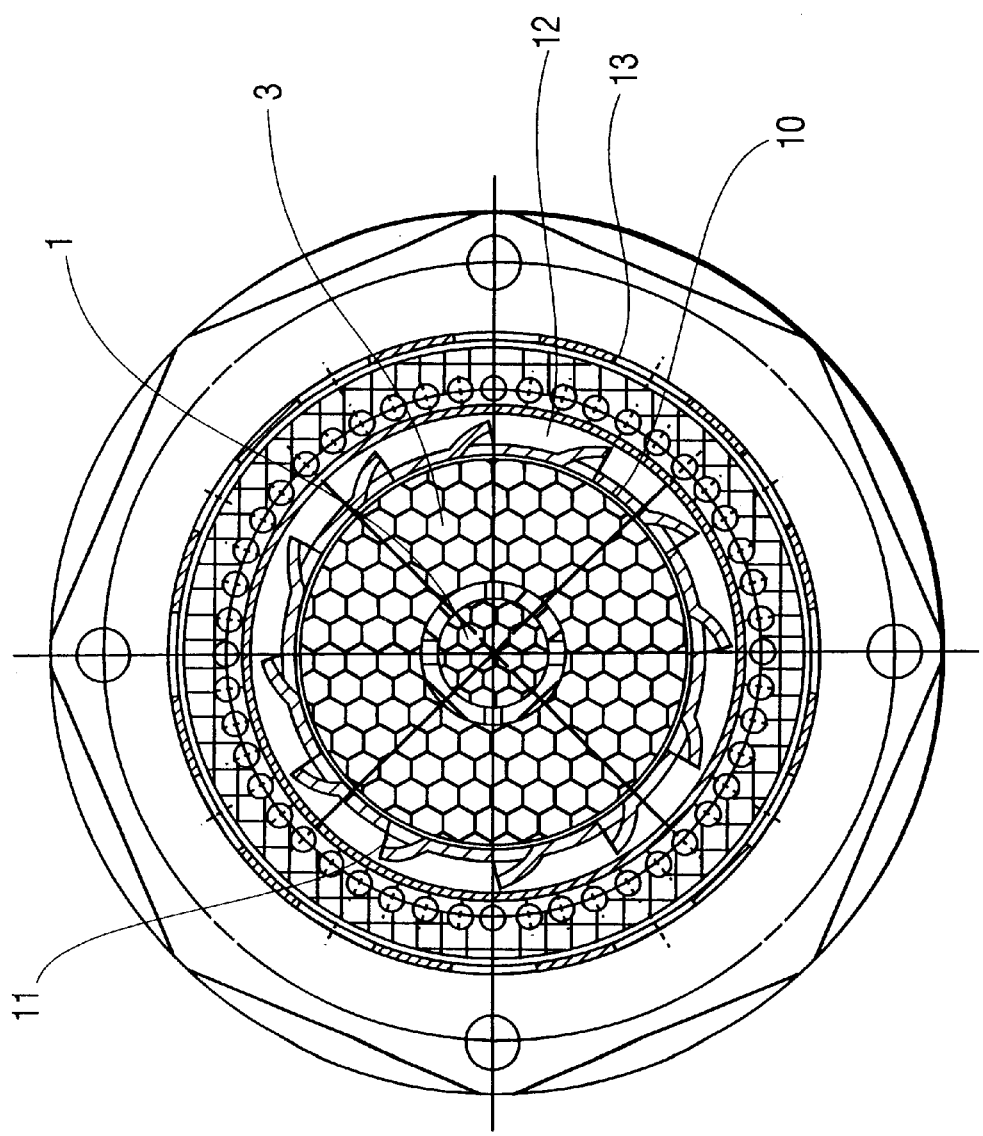

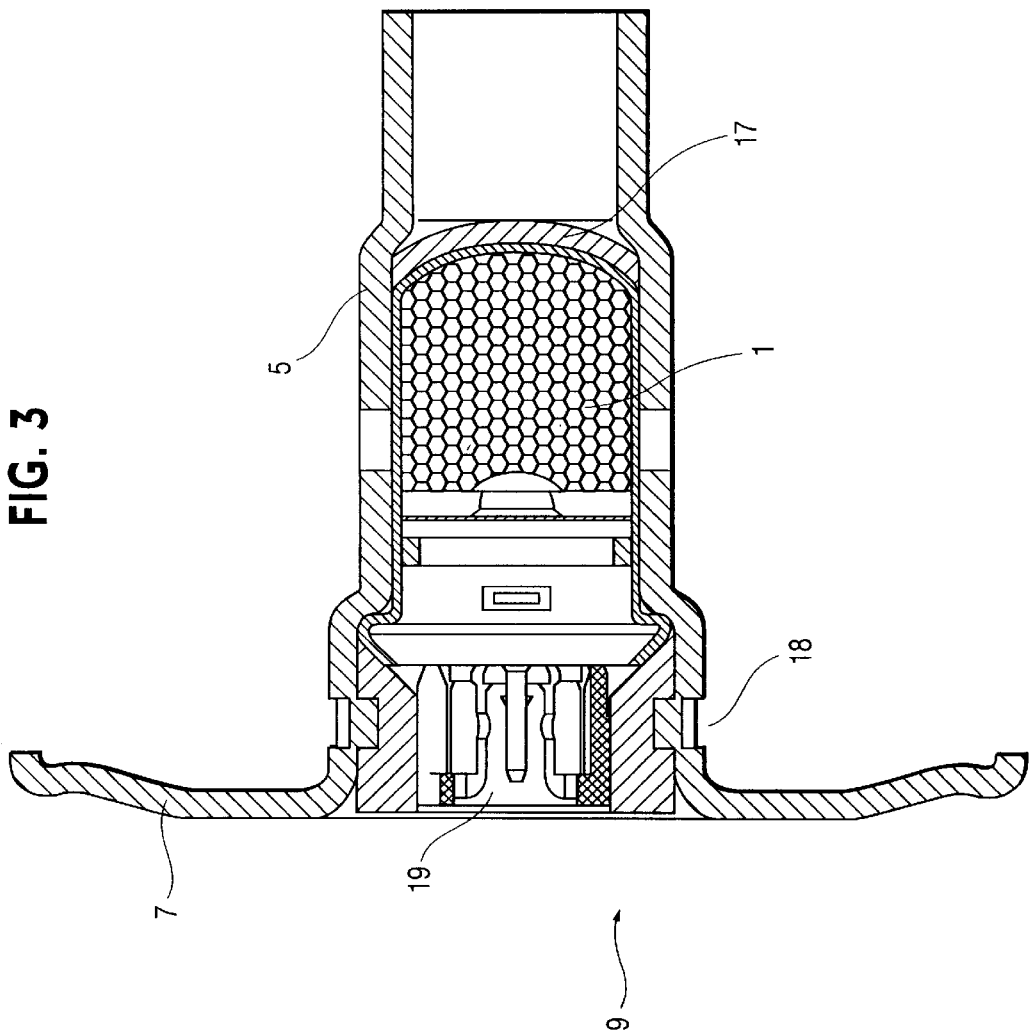

GAS GENERATOR MADE OF METAL SHEETS FOR PROTECTIVE DEVICES OF MOTOR VEHICLES PASSENGERS

BACKGROUND OF THE INVENTION

The invention relates to a gas generator of sheet-metal constructional type for a motor vehicle passenger protection device.

Such a gas generator of the type described is known from DE-A1-41 21 039. Said gas generator is constructed concentrically, a combustion chamber with a gas-generating charge being disposed around an ignition chamber with an igniter and an ignition charge and the combustion chamber being surrounded by an expansion chamber. The expansion chamber contains a dust-collecting space and a cooling/expansion space. The gas escaping through discharge apertures from the combustion chamber is divided into a primary flow and a secondary flow. The primary flow is forced into the dust-collecting space, while the purified gas is conveyed through the cooling/filter space into the gas pocket of the air bag. By increasing the velocity of the escaping gas, a high separation efficiency is attainable. This is achieved by the intrinsic discharge energy of the gas.

SUMMARY OF THE INVENTION

The object underlying the invention is to improve a gas generator in such a way that low manufacturing costs, low weight and good recycling properties are combined with a small overall size.

This object is achieved according to the invention by having the sheet metal parts forming the combustion chamber and the expansion chamber connected to one another exclusively by metal-forming techniques. By metal-forming techniques are understood flanging, edge-rolling, riveting, wobble riveting, caulking, pressing and reaming.

By connecting the individual sheet metal parts exclusively by means of metal-forming techniques, it is possible to achieve low manufacturing costs simultaneously with a smaller overall size and a lower weight. Furthermore, by virtue of good recycling properties disposal is guaranteed.

In a preferred embodiment, the combustion chamber is formed by two sheet metal parts, of which the inner part comprises a cylindrical inner wall with a bottom piece bent over at right angles at one end and the outer part comprises a cylindrical outer wall with a top piece bent over at right angles at one end.

According to the invention, the ignition chamber is a prefabricated ignition element which is disposed in the cylindrical inner wall of the inner part of the combustion chamber. In this way, an extremely compact structural shape with few parts is achieved.

According to the invention, the sheet metal parts are steel plates, e.g. special steel 1.4301 or 1.4303 having a wall thickness of preferably around 1.0 to 1.5 mm.

The gas-generating charge in the combustion chamber is advantageously disposed in a hermetically sealed storage container. The latter is preferably made of aluminium and is manufactured by extrusion or deep drawing and is absolutely impervious to external moisture. The wall thickness of the storage container is preferably around 0.2 to 0.5 mm.

Spin-generating outlet apertures are disposed between the combustion chamber and the expansion chamber. In a preferred embodiment, these outlet apertures take the form of cowl-shaped protuberances of the cylindrical outer wall of the outer part of the combustion chamber. Such protuberances are formed by cutting into and pressing out the combustion chamber wall. Compared to prior art, it is therefore possible to dispense with an additional structural part.

The expansion chamber advantageously comprises a separation chamber adjoining the outlet apertures and a filter chamber lying, in the sense of the flow direction, downstream thereof, the escaping gas being redirected through about 180° upon passing from the separation chamber to the filter chamber. As a result of such abrupt change in direction and in cooperation with the high centrifugal force caused by rotation of the escaping gas, a large proportion of the liquid and solid particles, which do not follow the change in direction, are separated from the gas flow.

The filter chamber is preferably occupied by a filter structure. As a result, a further filtering and cooling of the gas is effected.

In a preferred embodiment, one longitudinal wall of the filter chamber lies opposite the outlet apertures and this one longitudinal wall is inclined with respect to the combustion chamber wall (cylindrical outer wall of the outer part of the combustion chamber), thereby producing a reduction in diameter in the direction of low of the escaping gas. The required increase in the velocity of the escaping gas is achieved in this way.

For further filtering, one wall of the separation chamber is covered by a filter. Said filter preferably comprises a knitted or woven wire cloth.

The gas generator according to the invention is preferably suitable as a gas generator for the driver, i.e. for the driver's side of a motor vehicle.

BRIEF DESCRIPTION OF THE DRAWINGS

Further features of the invention are evident from the drawings, a detailed description of which follows. The drawings show:

FIG. 2A a section along the line II—II of FIG. 1,

FIG. 2B an enlarged sectional view of an aperture,

FIG. 3 a detail with the ignition element of an alternative form of securing and FIG. 4 a section through the expansion chamber of an alternative embodiment.

DETAILED DESCRIPTION OF THE PREFERRED EMBODIMENTS

Figure 1:
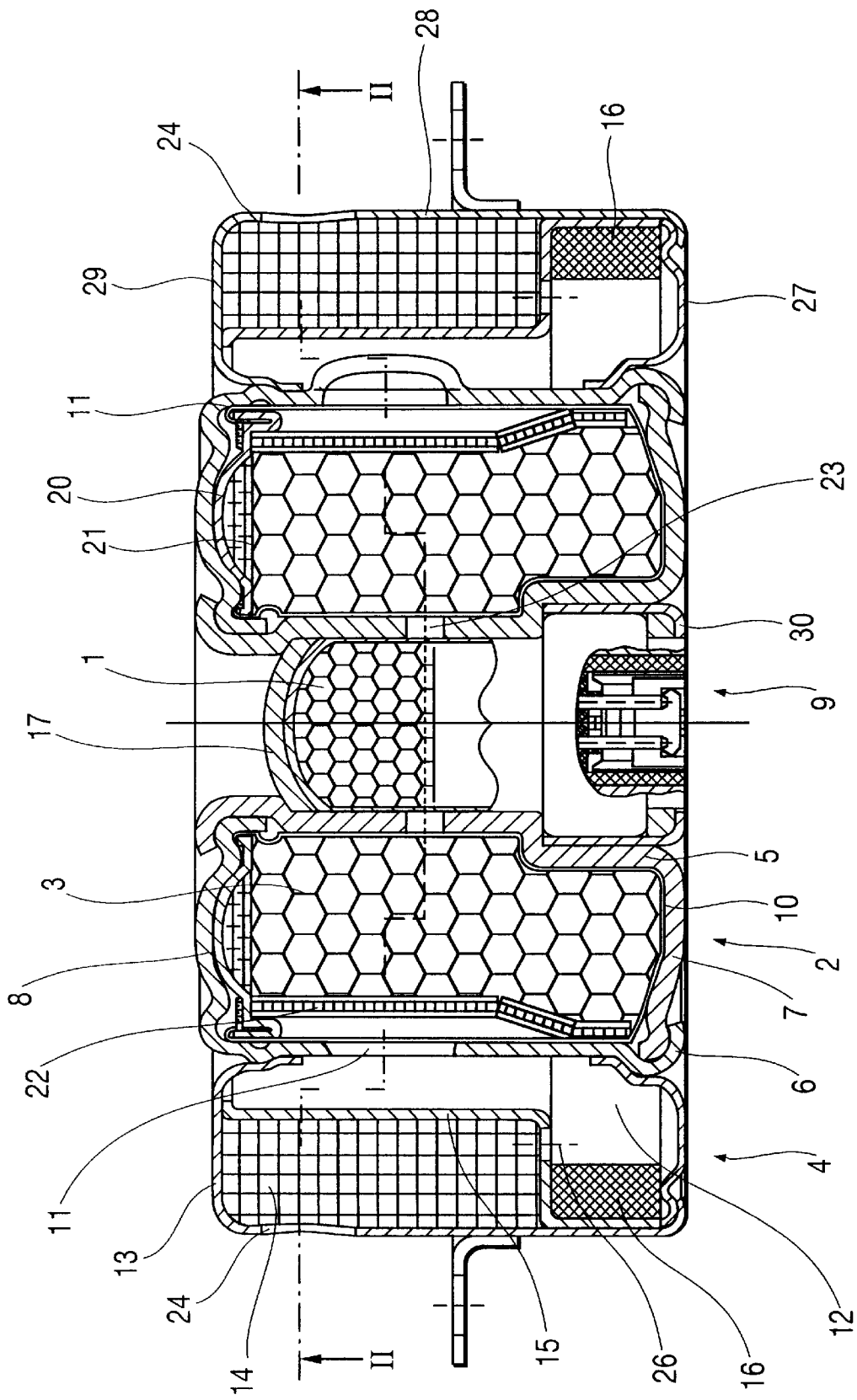
FIG. 1 a gas generator according to the invention, in section.

FIGS. 1 and 2 show a concentrically constructed gas generator according to the invention of sheet-metal constructional type which is for a motor vehicle passenger protection device. A combustion chamber 2 and an expansion chamber 4 are disposed around an ignition element 9. These chambers 2, 4 are manufactured from special steel exclusively by metal-forming techniques. The sheet metal parts forming the chambers 2, 4 can be steel plates.

The combustion chamber 2 is assembled from two sheet metal parts, namely an inner part 5 and an outer part 6. The inner part 5 comprises a cylindrical inner wall with a bottom piece 7 bent over at right angles at one end. The outer part 6 comprises a cylindrical outer wall with a top piece 8 bent over at right angles at one end. The two parts 5, 6 are connected to one another by edge-forming. An ignition element 9 is disposed inside the combustion chamber 2. To achieve this, a retaining plate 17, against which the ignition element 9 is applied, is incorporated in the wall of the combustion chamber 2. The ignition element 9 is fastened by means of a sleeve 30, which presses by means of flanges upon the ignition element 9. The inner part 5 and the sleeve 30 are connected to one another preferably by welding.

FIG. 3 shows the inner part 5 of the combustion chamber 2 to an enlarged scale compared to FIG. 1 and with the ignition element 9 inserted. The fastening here is effected by clinching, i.e. by the wall 18 of the inner part 5 being pressed radially in punctiform manner into a recess in the ignition element 9.

The ignition element 9 is prior art and comprises a socket 19 for connection to a plug and connection to an electronic control device. Disposed inside the ignition element 9 is an ignition bridge (not shown) which, upon application of a voltage, ignites a detonating agent which in turn causes an ignition charge 1 to ignite. The ignition element 9 may be a prefabricated ignition element.

Disposed in the combustion chamber 2 is a hermetically sealed storage container 10 which comprises an annular pot with a lid 20. Pot and lid 20 are lock-seamed to one another. For sealing purposes, the sealing region is provided with a coating such as, for example, an acrylate adhesive coating. The gas-generating charge 3 in the form of pellets of propellant is housed in the storage container 10. Additionally provided is a volume compensator 21 and a woven wire cloth 22, which prevents blocking of the outlet apertures 11. The woven wire cloth 22 is disposed for such purpose at a specific distance from the wall of the storage container 10 and extends over the entire length of the storage container 10.

Disposed in the inner part 5 of the combustion chamber 2 are holes 23 which allow the ignition flash of the ignition element 9 to enter the combustion chamber 2. After ignition of the ignition element 9 has been initiated, the ignition flash from the ignition element of course penetrates the storage container 10 and ignites the gas-generating charge 3. After a specific bursting pressure has been reached, the storage container 10 is opened at the outlet apertures 11 of the combustion chamber 2. These outlet apertures 11, in the form of cowl-shaped protuberances or segmental apertures preferably in the shape of a rectangle or segment of a circle are pressed outwards, thereby achieving a tangential discharge of the gas from the combustion chamber 2. Preferably, twelve outlet apertures 11 are disposed uniformly on the periphery.

Disposed adjacent to the combustion chamber 2 is an expansion chamber 4 comprising a separation chamber 12 and a filter chamber 13. The escaping gas passes out of the outlet apertures 11 into the separation chamber 12, where it is conveyed spirally towards the base plate. In the region of the base plate, the gas flow is abruptly redirected through about 180° and passes through openings 26 into the filter chamber 13, which is filled with filter mass 14. The openings 26 are disposed immediately after the transition from the vertical into the horizontal. Working together with this action is the high centrifugal force caused by rotation, and, as a result, a large proportion of the liquid and solid particles, which do not follow the change in direction, is separated from the gas flow.

The liquid and solid particles separated from the gas in said manner are retained in a knitted or woven wire cloth attached as filter 16 to the outer wall of the separation chamber 12. For further filtering and cooling, the gases flow through a filter 14 in the filter chamber 13 and flow through the outlet apertures 24 into the air bag. The filter 14 is preferably composed of coarse woven cloth for cooling and of braided texture for fine filtering.

Figure 4:
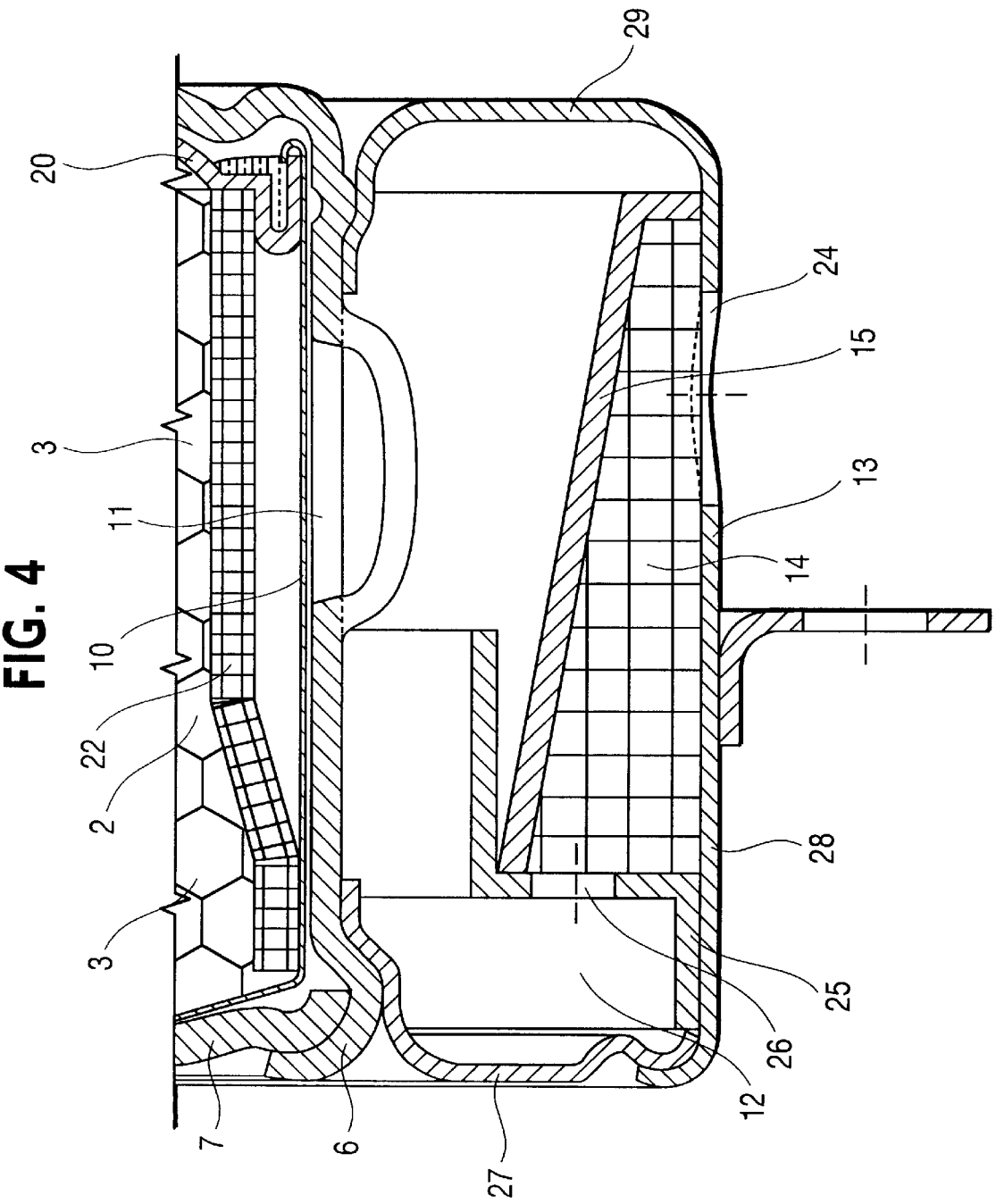

FIG. 4 shows a special construction of the expansion chamber 4. Here, the longitudinal wall 15 of the filter chamber 13 lying opposite the outlet apertures 11 of the combustion chamber 2 is inclined relative to the combustion chamber wall (cylindrical outer wall of the outer part 6 of the combustion chamber 2), thereby producing a reduction in diameter in the direction of flow of the escaping gas. The longitudinal wall 15 rests on a spacer flange 25, in which the openings 26 are also disposed. The spacer flange 25 and the longitudinal wall 15 are simply inserted into the expansion chamber 4.

As already revealed in FIG. 1, the expansion chamber 4 in the embodiment according to FIG. 4 likewise comprises only two metal sheets, namely a bottom sheet 27 and a peripheral piece 28 with a bent-over top 29.

The described gas generator is notable for the following advantages:

- connection of the individual sheet metal parts by means of metal-forming techniques such as flanging and edge-rolling/enables low manufacturing costs to be obtained;
- the use of steel plates permits a compact and lightweight style of construction;
- the tangential flow out of segmental apertures which sets the gas flow in rotation, combined with the abrupt change in direction of the gas fumes, effects a high degree of separation and allows the use of simple built-on filter units;
- good recycling properties through the use of only one material for the housing and filtering, e.g. special steel 1.4301.

We claim:

1. Gas generator for a motor vehicle passenger protection device, the gas generator comprising an ignition chamber having an igniter and an ignition charge, a combustion chamber with a gas-generating charge disposed concentrically around the ignition chamber, and an expansion chamber disposed concentrically around the combustion chamber, wherein the combustion chamber and the expansion chamber are formed of sheet metal parts connected to one another exclusively by metal-forming techniques and wherein at least two adjacent sheet metal parts are connected to one another by bending only through an angle of 90°.

2. Gas generator according to claim 1, wherein the sheet metal parts are steel plates.

3. Gas generator according to claim 1 wherein the gas-generating charge in the combustion chamber is disposed in a hermetically sealed storage container.

4. Gas generator according to claim 1, wherein the combustion chamber comprises a cylindrical inner wall with a bottom piece bent over at right angles at one end and a cylindrical outer wall with a top piece bent over at right angles at one end.

5. Gas generator according to claim 4, wherein the ignition chamber is a prefabricated ignition element which is disposed in the cylindrical inner wall of the combustion chamber.

6. Gas generator according to claim 4, further comprising spin-generating outlet apertures in the form of cowl-shaped protuberances of the cylindrical outer wall of the combustion chamber.

7. Gas generator according to claim 6, wherein the expansion chamber comprises a separation chamber adjoining the outlet apertures and the filter chamber lying downstream thereof, such that escaping gas, upon passing from the separation chamber to the filter chamber, is redirected through about 180°.

8. Gas generator according to claim 7, wherein the filter chamber is occupied by a filter structure.

9. Gas generator according to claim 7, wherein one longitudinal wall of the filter chamber lies opposite the outlet apertures.

10. Gas generator according to claim 9, wherein the one longitudinal wall is inclined relative to the cylindrical outer wall of the combustion chamber, thereby producing a reduction in diameter in the direction of flow of the escaping gas.

11. Gas generator according to claim 7, wherein one wall of the separation chamber is covered by a filter.

* * * * *